(12) United States Patent
Aguirre et al.

(10) Patent No.: US 8,953,465 B2
(45) Date of Patent: Feb. 10, 2015

(54) NETWORK OPTIMIZATION BASED ON USER EQUIPMENT TYPE

(75) Inventors: Sergio Aguirre, Southlake, TX (US); Raafat Edward Kamel, Little Falls, NJ (US); Lalit Ratilal Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 928 days.

(21) Appl. No.: 12/954,365

(22) Filed: Nov. 24, 2010

(65) Prior Publication Data

US 2012/0128084 A1 May 24, 2012

(51) Int. Cl.
*H04L 12/26* (2006.01)
*H04W 72/04* (2009.01)
*H04W 28/02* (2009.01)
*H04W 36/32* (2009.01)
*H04L 5/00* (2006.01)

(52) U.S. Cl.
CPC ........... *H04W 72/048* (2013.01); *H04L 5/0069* (2013.01); *H04W 28/0226* (2013.01); *H04W 28/0215* (2013.01); *H04W 36/32* (2013.01)

USPC ........... 370/252; 370/331; 455/441; 709/226; 709/229

(58) Field of Classification Search
None
See application file for complete search history.

(56) References Cited

U.S. PATENT DOCUMENTS

| | | | |
|---|---|---|---|
| 2005/0179607 A1 | 8/2005 | Gorsuch et al. | |
| 2006/0294246 A1* | 12/2006 | Stieglitz et al. | 709/228 |
| 2007/0173303 A1 | 7/2007 | Viorel et al. | |
| 2009/0067395 A1* | 3/2009 | Curtis et al. | 370/338 |
| 2010/0064025 A1* | 3/2010 | Nelimarkka et al. | 709/217 |
| 2010/0311321 A1 | 12/2010 | Norin | |
| 2010/0313232 A1 | 12/2010 | Norin | |
| 2011/0051835 A1* | 3/2011 | Yuan et al. | 375/267 |
| 2011/0059741 A1* | 3/2011 | Klein | 455/436 |

* cited by examiner

*Primary Examiner* — Khoa Huynh

(57) ABSTRACT

A network device may include a first set of components and a second set of components. The first set of components may manage, using a first set of parameters, at least one of uplink radio resources or downlink radio resources for a group of mobile user equipment. The second set of components may manage, using a second set of parameters, at least one of uplink radio resources or downlink radio resources for a group of fixed user equipment. The second set of parameters may be different than the first set of parameters.

20 Claims, 7 Drawing Sheets

| ID 410 | UE TYPE 420 |
|---|---|
| ID | TYPE |
| ID | TYPE |
| ID | TYPE |
| ID | TYPE |
| ... | ... |
| ID | TYPE |

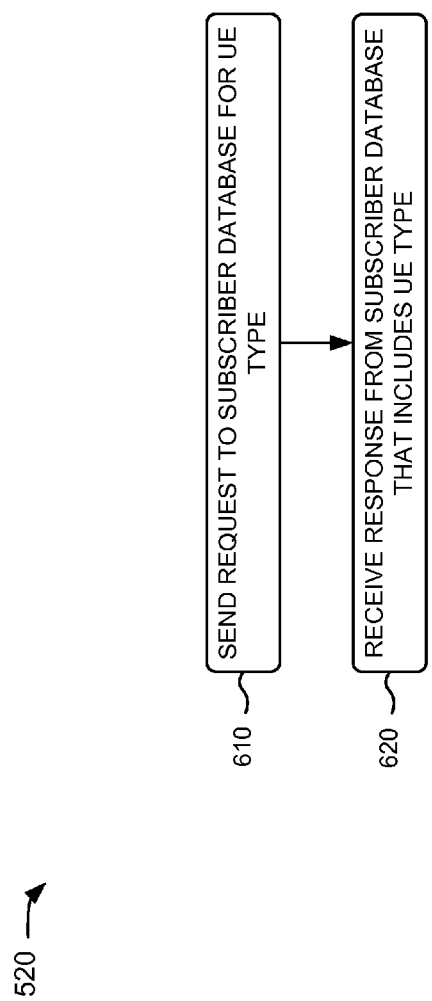

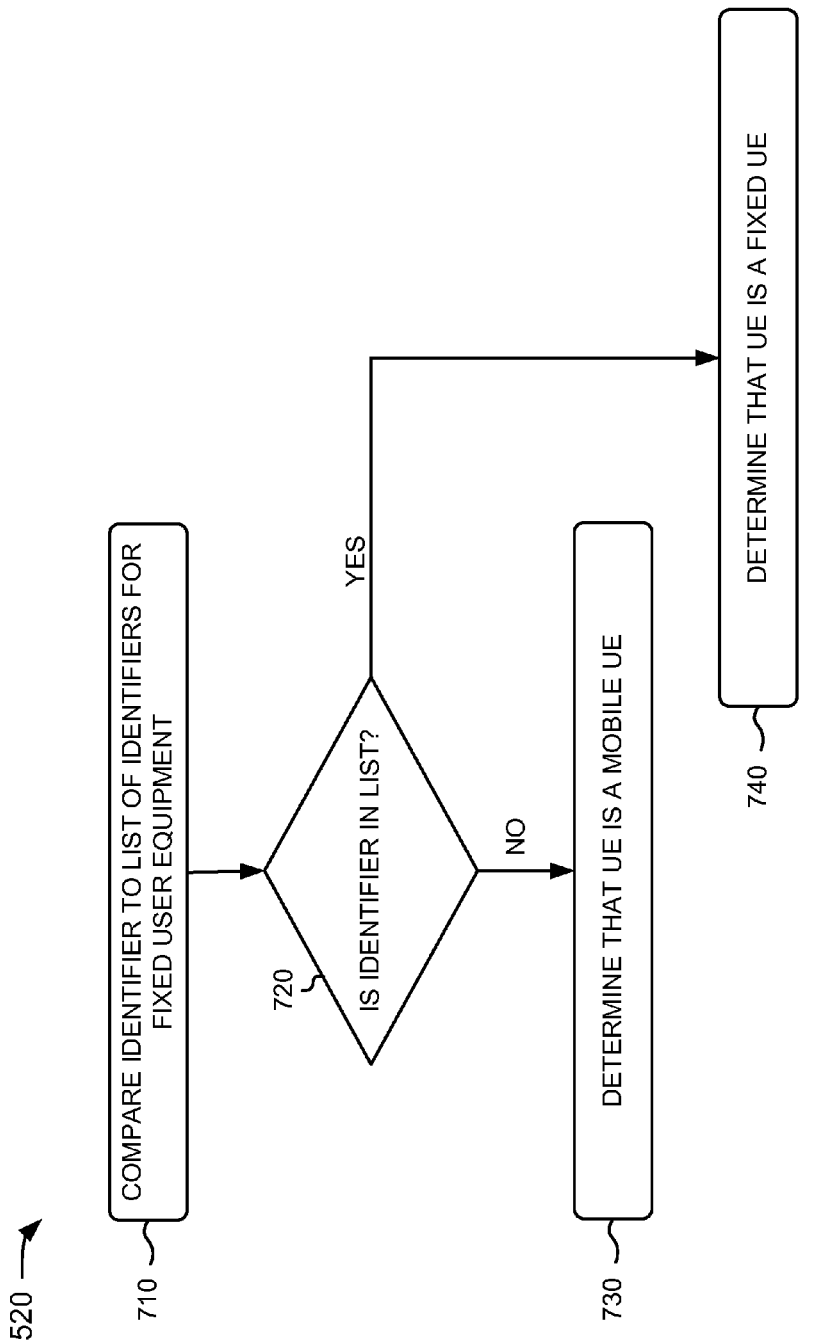

NETWORK OPTIMIZATION BASED ON USER EQUIPMENT TYPE

BACKGROUND INFORMATION

Mobile wireless users and fixed wireless users may share the same network elements and radio spectrum. In such situations where mobile wireless users and fixed wireless users share the same network elements and radio spectrum, network subsystems and their related parameters are often optimized and selected for mobile wireless services. Fixed wireless services are overlaid on the mobile wireless services, operating with the same subsystems and parameters.

BRIEF DESCRIPTION OF THE DRAWINGS

FIG. 4 is a diagram of a portion of a subscriber database of FIG. 1; and

FIGS. 5-7 are flow charts of an example process for managing user equipment.

DETAILED DESCRIPTION OF PREFERRED EMBODIMENTS

The following detailed description of embodiments refers to the accompanying drawings. The same reference numbers in different drawings may identify the same or similar elements.

Implementations described herein may provide, in situations where mobile user equipment and fixed user equipment share the same network elements and radio spectrum, systems and/or methods that tailor network resources and/or parameters based on types of user equipment to which the network resources are provided. For example, the systems and/or methods may provide a first set of optimized network resources and/or parameters to mobile user equipment and a second set of optimized network resources and/or parameters to fixed user equipment.

Figure 1:
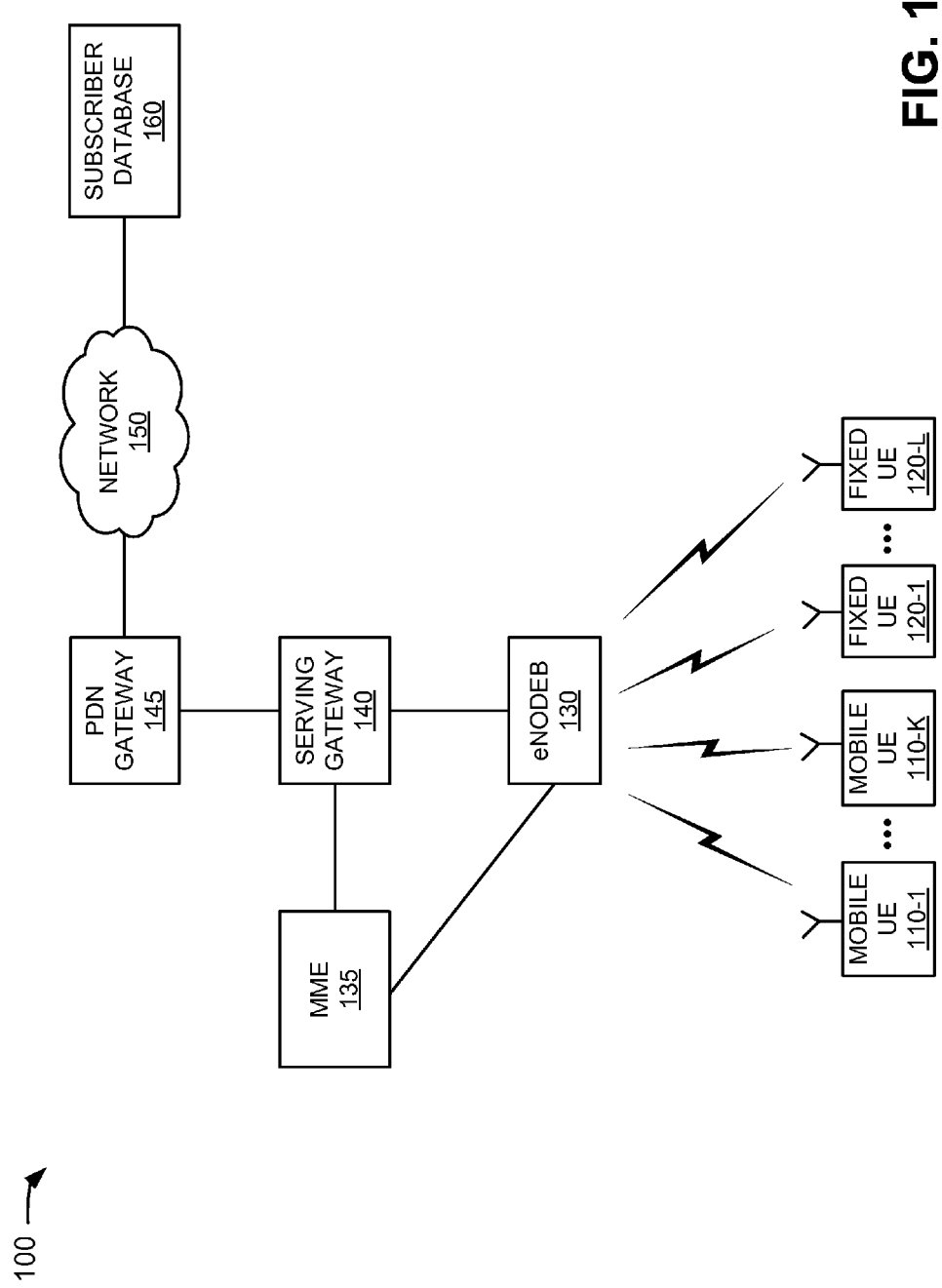
FIG. 1 is a diagram of an example network in which systems and/or methods described herein may be implemented.

FIG. 1 is a diagram of an example network 100 in which systems and/or methods described herein may be implemented. Network 100 may include a group of mobile user equipment (UE) 110-1 through 110-K (K≥1) (referred to collectively, and in some instances individually, as "mobile user equipment 110"), a group of fixed user equipment 120-1 through 120-L (L≥1) (referred to collectively, and in some instances individually, as "fixed user equipment 120"), an evolved NodeB (eNodeB) 130, a mobility management entity (MME) 135, a serving gateway 140, a packet data network (PDN) gateway 145, a network 150, and a subscriber database 160. eNodeB 130, mobility management entity 135, serving gateway 140, and PDN gateway 145 may, together, correspond to an Evolved Packet System (EPS) system.

Mobile user equipment 110 may include one or more mobile (or portable) devices or systems capable of sending/receiving data to/from radio access network 130. Mobile user equipment 110 may include, for example, wireless devices or systems that are portable, such as wireless telephones, personal digital assistants (PDAs), smart phones, laptop computers, etc.

Fixed user equipment 120 may include one or more fixed devices capable of sending/receiving data to/from radio access network 130. Fixed user equipment 120 may include, for example, wireless devices or systems that are situated in fixed locations, such as an office or home. Fixed user equipment 120 may include, for example, computer devices, set-top boxes, gaming systems, televisions, copiers, printers, and/or other types of devices.

eNodeB 130 may include one or more devices that receive voice and/or data from mobility management entity 135, serving gateway 140, and/or another device and transmit that voice and/or data to mobile user equipment 110 and fixed user equipment 120 via an air interface. eNodeB 130 may also include one or more devices that receive voice and/or data from mobile user equipment 110 and fixed user equipment 120 over an air interface and transmit that voice and/or data to mobility management entity 135, serving gateway 140, and/or another device (such as another mobile/fixed user equipment 110/120).

Mobility management entity 135 may include one or more devices that manage mobility, user equipment 110/120 identities, and security parameters. Mobility management entity 135 may perform one or more of the following functions: non-access stratum (NAS) signaling; NAS signaling security; security control; inter-core network signaling for mobility between 3GPP access networks; idle mode user equipment 110/120 reachability; tracking area list management (for user equipment 110/120 in idle and active modes); handovers to and/or from network 100; roaming; traffic policing functions; authentication operations; bearer management functions; etc.

Serving gateway 140 may include one or more data transfer devices (or network devices), such as a gateway, a router, a switch, a firewall, a network interface card (NIC), a hub, a bridge, a proxy server, an optical add-drop multiplexer (OADM), or some other type of device that processes and/or transfers data. In one example implementation, serving gateway 140 may route and forward user data packets, may act as a mobility anchor for a user plane during inter-eNodeB handovers, and may act as an anchor for mobility between LTE and other 3GPP technologies. For idle state user equipment 110/120, serving gateway 140 may terminate a downlink (DL) data path and may trigger paging when down link data arrives for user equipment 110/120.

PDN gateway 145 may include one or more devices that act as a gateway for additional networks, such as network 150. In other words, PDN gateway 145 may provide connectivity from user equipment 110/120 to external packet data networks by being the point of exit and entry of traffic for user equipment 110/120. PDN gateway 145 may perform policy enforcement, packet filtering, and/or other services relating to the access of user equipment 110/120 to the external packet data network.

Network 150 may include a local area network (LAN), a wide area network (WAN), a metropolitan area network (MAN), a telephone network, such as the Public Switched Telephone Network (PSTN), a cellular network, a Wi-Fi network, an intranet, the Internet, an optical fiber (or fiber optic)-based network, or a combination of these or other types of networks.

Subscriber database 160 may include one or more databases that store information relating to subscribers (e.g., users of user equipment 110 and/or 120). In one implementation, subscriber database 160 may associate an identifier with information identifying the type of user equipment with which the identifier is associated. For example, subscriber database 160 may associate an identifier with information identifying the user equipment as either mobile or fixed.

Subscriber database 160 may connect to network 150 via wired and/or wireless connections. In one example, subscriber database 160 may be provided in one or more computing devices.

Although FIG. 1 shows example components of network 100, in other implementations, network 100 may include fewer components, different components, differently arranged components, or additional components than depicted in FIG. 1. Additionally, or alternatively, one or more components of network 100 may perform the tasks described as being performed by one or more other components of network 100.

Figure 2:
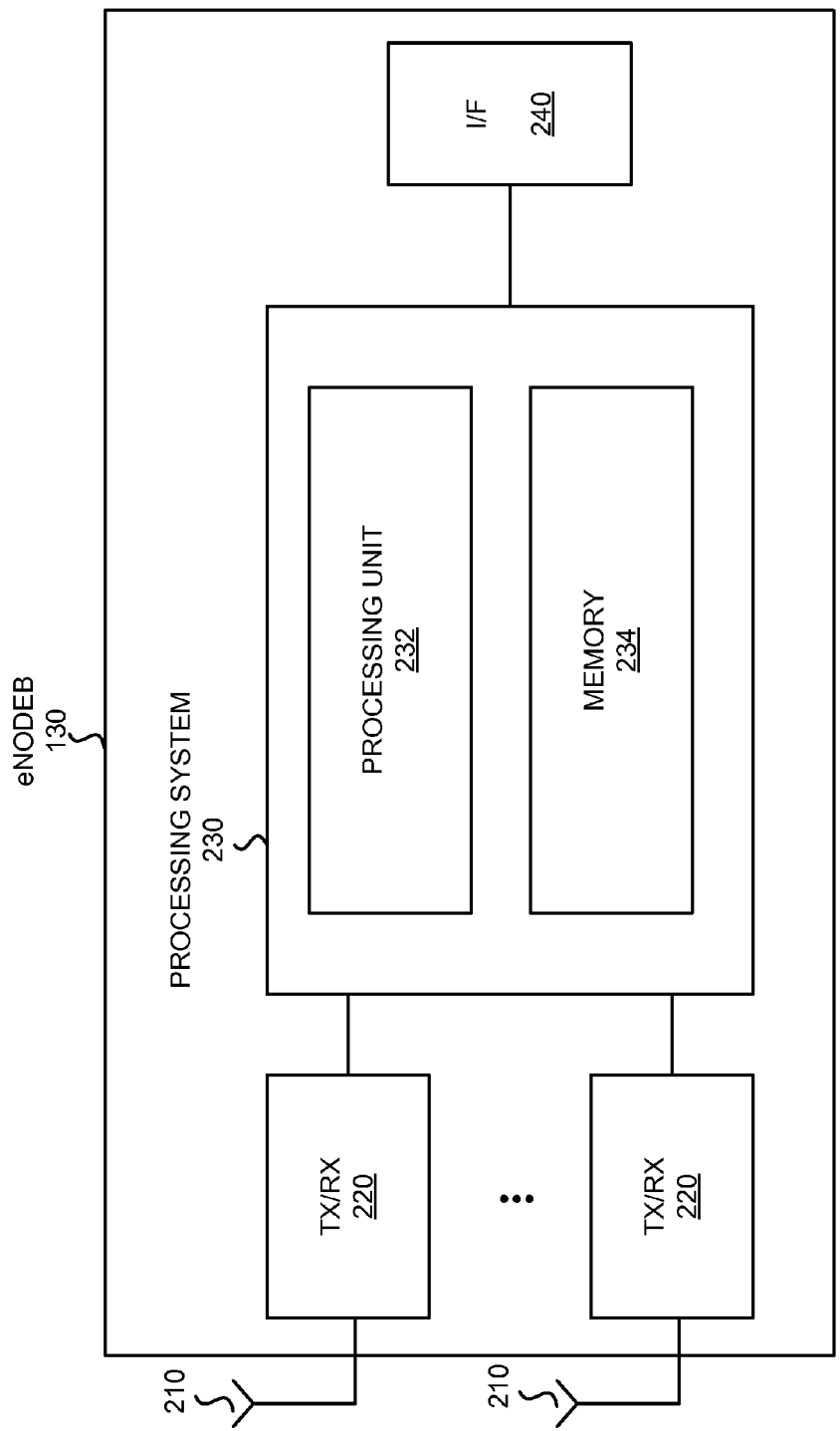
FIG. 2 is a diagram of example components of a portion of an evolved NodeB (eNodeB) of FIG. 1 according to an implementation.

FIG. 2 is a diagram of example components of a portion of eNodeB 130 according to an implementation. As shown in FIG. 2, eNodeB 130 may include antennas 210, transceivers (TX/RX) 220, processing system 230, and interface (I/F) 240.

Antennas 210 may include one or more directional and/or omni-directional antennas. Transceivers 220 may be associated with antennas 210 and include transceiver circuitry for transmitting and/or receiving symbol sequences in a network, such as network 100, via antennas 210.

Processing system 230 may control the operation of eNodeB 130. Processing system 230 may also process information received via transceivers 220 and interface 240. As illustrated, processing system 230 may include a processing unit 232 and a memory 234.

Processing unit 232 may process information received via transceivers 220 and interface 240. Processing unit 232 may include one or more processors, microprocessors, field programmable gate arrays (FPGAs), application specific integrated circuits (ASICs), etc. The processing, performed by processing unit 232, may include, for example, data conversion, forward error correction (FEC), rate adaptation, quadrature phase shift keying (QPSK) modulation, etc. In addition, processing unit 232 may generate control messages and/or data messages and cause those control messages and/or data messages to be transmitted via transceivers 220 and/or interface 240. Processing unit 232 may also process control messages and/or data messages received from transceivers 220 and/or interface 240.

Memory 234 may include a random access memory (RAM), a read only memory (ROM), and/or another type of memory to store data and instructions that may be used by processing unit 232.

As described herein, eNodeB 130 may perform certain operations in response to processing unit 232 executing software instructions of an application contained in a computer-readable medium, such as memory 234. A computer-readable medium may be defined as a non-transitory memory device. A memory device may include memory space within a single physical memory device or spread across multiple physical memory devices. The software instructions may be read into memory 234 from another computer-readable medium or from another device. The software instructions contained in memory 234 may cause processing unit 232 to perform processes described herein. Alternatively, hardwired circuitry may be used in place of or in combination with software instructions to implement processes described herein. Thus, implementations described herein are not limited to any specific combination of hardware circuitry and software.

Interface 240 may include one or more line cards that allow eNodeB 130 to transmit data to and receive data from mobility management entity 135 and/or serving gateway 140.

Although FIG. 2 shows example components of eNodeB 130, in other implementations, eNodeB 130 may include fewer components, different components, differently arranged components, or additional components than depicted in FIG. 2. Additionally, or alternatively, one or more components of eNodeB 130 may perform the tasks described as being performed by one or more other components of eNodeB 130.

Figure 3:
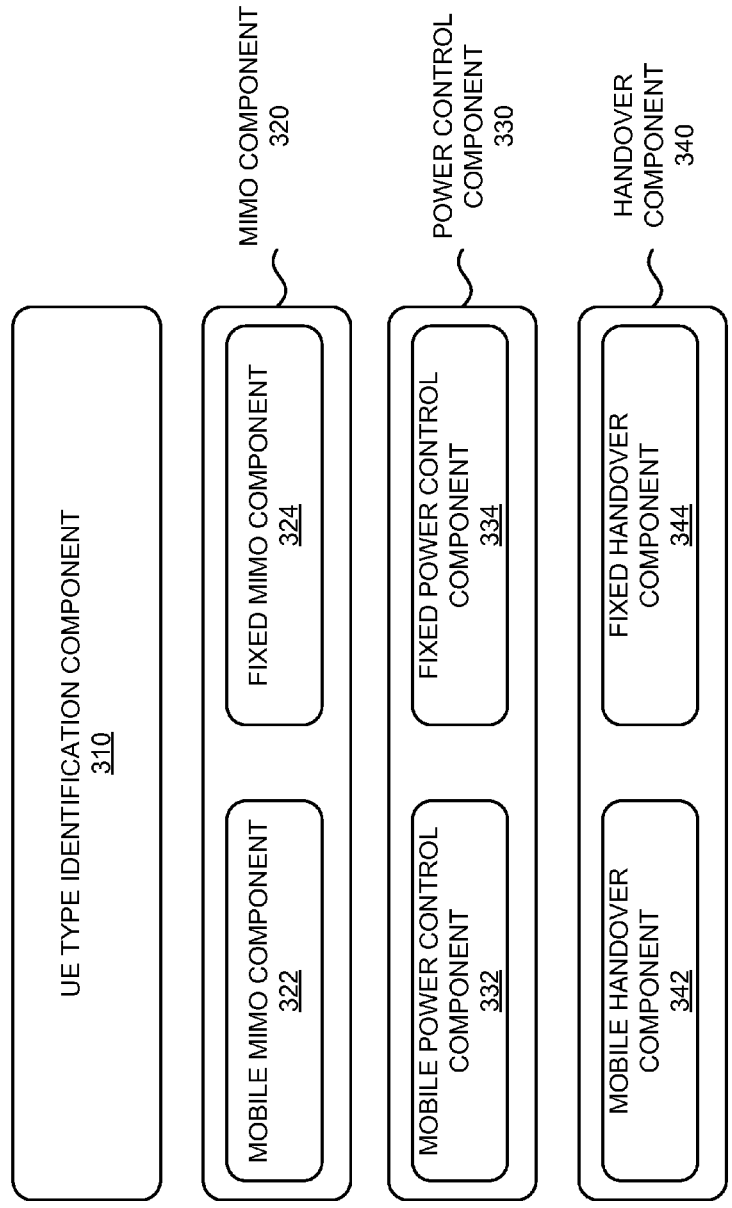
FIG. 3 is a diagram of example functional components of a portion of the eNodeB of FIG. 1.

FIG. 3 is a diagram of example functional components of a portion of eNodeB 130. In one implementation, the functional components described in connection with FIG. 3 may be implemented via, for example, processing unit 232 executing instructions contained in memory 234. As illustrated, eNodeB 130 may include a user equipment type identification component 310, a Multiple-Input, Multiple-Output (MIMO) component 320, a power control component 330, and a handover component 340.

User equipment type identification component 310 may include one or more components that identify a particular user equipment as either mobile or fixed. For example, user equipment type identification component 310 may receive an identifier from a user equipment and determine, based on the received identifier, whether the user equipment is a mobile user equipment or a fixed user equipment. In one implementation, user equipment type identification component 310 may retrieve information identifying the particular user equipment as mobile or fixed from a remote device, such as subscriber database 160. Alternatively, user equipment type identification component 310 may maintain a list of identifiers that are only associated with fixed user equipment 120. Thus, user equipment type identification component 310 may compare a received identifier to the list to determine whether the particular user equipment is mobile or fixed.

MIMO component 320 may include one or more components that manage downlink network resources (e.g., assigning bandwidth, scheduling transmissions on downlink time slots, etc.) for mobile user equipment 110 and fixed user equipment 120 based on radio network conditions. For example, MIMO component 320 may assign bandwidth to mobile user equipment 110 and fixed user equipment 120, schedule the transmission of data on downlink time slots for mobile user equipment 110 and fixed user equipment 120, and/or perform other types of tasks for mobile user equipment 110 and fixed user equipment 120. In one implementation, MIMO component 320 may include a mobile MIMO component 322 for managing mobile user equipment 110 and a fixed MIMO component 324 for managing fixed user equipment 120.

MIMO component 320 may use different types of MIMO schemes for mobile user equipment 110 and fixed user equipment 120. The MIMO schemes may include, for example, an open loop configuration, a closed loop configuration, and/or another type of MIMO configuration supported in 4th generation standards. The open loop configuration may include an open loop spatial multiplexing mode and an open loop transmit diversity mode. The closed loop configuration may include a closed loop spatial multiplexing mode and a closed loop transmit diversity mode.

In operation, user equipment 110/120 and eNodeB 130 may exchange, in real-time, various Physical Layer (Layer 1 or L1) parameters relating to channel conditions. For example, in an open loop configuration, user equipment 110/120 may report a channel quality indicator (CQI) and a rank indicator (RI). Based on these indicators (and possibly other information), MIMO component 320 may switch to/from different MIMO modes. For instance, MIMO component 320 may switch from the open loop transmit diversity mode (e.g., when Rank Indicator=1) to the open loop spatial multiplexing mode (e.g., when Rank Indicator=2) in an attempt to maximize instantaneous user throughput. MIMO component 320 may make switching decisions based on the user equipment's recommendations or may apply digital filters to the noisy user equipment measurements. In addition, MIMO component 320 (e.g., mobile MIMO component 322 and fixed MIMO component 324) may impose additional constraints (e.g., a smoothed minimum received signal to interference noise ratio (SINR) value) in making mode transition decisions. MIMO component 320 may make decisions regarding management of mobile user equipment 110 and fixed user equipment 120 at a periodic interval. In one implementation, MIMO component 320 may make management decisions approximately every millisecond. Other time intervals may alternatively be used.

Mobile MIMO component 322 and fixed MIMO component 324 may make decisions regarding switching between open loop transmit diversity and open loop spatial multiplexing through the use of separate state machines that may include two states and different filters, thresholds, and additional eNodeB constraints, which may be derived initially via computer simulations and refined empirically. The MIMO parameters and constants, used by mobile MIMO component 332 and that have been optimized for mobile user equipment 110, may be sub-optimum for use by fixed MIMO component 324 for servicing fixed user equipment 120. By dynamically applying separate sets of state machines (e.g., with different filters, thresholds, and constants) optimized independently for mobile user equipment 110 and fixed user equipment 120, fixed MIMO component 324 may significantly improve, for fixed user equipment 120, user throughput, as well overall network radio capacity. Thus, the state machines may allow for mobile user equipment 110 and fixed user equipment 120 to be optimally, simultaneously, and independently managed.

Due to the unique channel conditions associated with fixed user equipment 120 (as compared to the constantly changing channel conditions that are typically associated with mobile user equipment 110), there may be a much higher probability of supporting open loop spatial multiplexing for fixed user equipment 120, due to lower channel correlation typically experienced by the fixed channel. Fixed MIMO component 324 may exploit this lower channel correlation for fixed user equipment 120 by properly placing more optimistic thresholds for the state transitions governing the state machine for fixed user equipment 120.

Table 1 shows example transitions for the state machines implemented by mobile MIMO component 322 and fixed MIMO component 324. For simplicity, Table 1 includes only the L1 parameters, along with the channel quality indicator and the rank indicator, which are typically filtered by MIMO component 320. Alternatively, or additionally, MIMO component 320 may impose additional constraints (e.g., a minimum smoothed SINR) to allow transitions from the open loop spatial multiplexing mode to the open loop transmit diversity mode.

TABLE 1

| State (To/From) | | Trigger |
| --- | --- | --- |
| SM | SM | CQI(i, User_T) > CThU(User_T) AND RI(i, User_T) > RThU(User_T) |
| SM | Tx Div | CQI(i, User_T) < CThD(User_T) OR [CQI(i, User_T) > CThD(User_T) AND RI(i, User_T) < RThD(User_T)] |
| Tx Div | SM | CQI(i, User_T) > CThU(User_T) AND RI(i, User_T) > RThU(User_T) |
| Tx Div | Tx Div | CQI(i, User_T) < CThU(User_T) OR [CQI(i, User_T) > CThU(User_T) AND RI(i, User_T) < RThU(User_T)] | where i=1, . . . , n may denote discrete time (typically measured in units of a time transmission interval (TTI)), User_T may correspond to the user type (mobile or fixed), CQI(i, User_T) may correspond to a channel quality indicator at time i, for a user type (mobile or fixed), RI(i,User_Type) may correspond to a rank indicator at time i, for a user type (mobile or fixed), and CThU(User_T), RThU(User_T), CThD(User_T), RThD(User_T) may correspond to thresholds for either mobile or fixed user equipment.

As indicated above, MIMO component 320 may support a closed loop MIMO configuration. For example, with respect to the closed loop spatial multiplexing mode, eNodeB 130 may apply a precoding matrix (e.g., identified by a codebook index) to the two formatted codewords (user data), CW0 and CW1, before transmitting the user data. eNodeB 130 may transmit one or two codewords, depending on the number of spatial layers supported by the prevailing channel conditions at any particular instant of time. In a closed loop MIMO transmission mode, user equipment 110/120 may periodically report the following parameters:

Precoding Matrix Indicator (PMI), which may point to a quantized channel matrix that best represents the prevailing channel conditions;
Channel Quality Indicator for codeword 1 (CQ1);
Channel Quality Indicator for codeword 1 (CQ2);
Rank Indicator (RI), which may represent the number of possible layers supported at an instant of time by the spatial channel.

User equipment 110/120 may report parameters PMI and CQI as either wideband or narrowband (e.g., frequency selective). The reported PMI value may be conditioned on its associated RI value, while the reported CQI value may be conditioned on its associated RI and PMI values. For example, if RI=1, user equipment 110/120 may only report one CQI value, while if RI=2, user equipment 110/120 may report two CQI values. In one implementation, MIMO component 320 (e.g., a scheduler within or external to MIMO component 320) may receive reports from user equipment 110/120 and, within milliseconds (or another time interval), may apply the corresponding precoding matrix in the eNodeB transmission path.

Similar to the open loop configuration, MIMO component 320 may, using a two-state state machine, transition between the closed loop transmit diversity mode and the closed loop spatial multiplexing mode. In another implementation, MIMO component 320 may use a four-state state machine. In either event, the two-state or four-state state machine may allow for mobile user equipment 110 and fixed user equipment 120 to be optimally, simultaneously, and independently managed.

Due to the noisy nature of the measurements from user equipment 110/120, the state transitions may, in one implementation, include comparisons of filtered versions of the Rank Indictor, CQ1, and CQ2 against predetermined thresholds. Additionally, or alternatively, MIMO component 320 may apply an exponentially weighted filter, with a forgetting factor, to the reported Rank Indicator. MIMO component 320 (e.g., mobile MIMO component 322 and fixed MIMO component 324) may impose additional constraints on the filtered SINR value in making mode transition decisions.

In addition to supporting the switching between open loop spatial multiplexing and open loop transmit diversity modes and the switching between closed loop spatial multiplexing and closed loop transmit diversity modes, MIMO component 320 may also support the switching between the open loop spatial multiplexing mode (sometimes referred to as "Transmission Mode 3" or simply "TM3") and the closed loop spatial multiplexing mode (sometimes referred to as "Transmission Mode 4" or simply "TM4"). Since Transmission Mode 4 outperforms Transmission Mode 3 for fixed user equipment 120, fixed MIMO component 324 may switch fixed user equipment 120 over to Transmission Mode 4, depending on network conditions.

Power control component 330 may include one or more components that control transmission power, in the uplink, relating to mobile user equipment 110 and fixed user equipment 120. By controlling transmission power relating to user equipment 110/120, power control component 330 may act to reduce interference in network 100, as well as to save battery power (if needed) of those user equipment 110/120 that use battery power. Power control component 330 may include a mobile power control component 332 that may, for example, control power, for mobile user equipment 110, for uplink data channels, uplink control channels, and/or reference signals transmitted from mobile user equipment 110. In addition, power control component 330 may include a fixed power control component 334 that may, for example, control power, for fixed user equipment 120, for uplink data channels, uplink control channels, and/or reference signals transmitted from fixed user equipment 120.

With respect to power management by mobile power control component 332 and fixed power control component 334, power control component 330 may include an open loop component and a closed loop component. Regarding the open loop component, user equipment 110/120 may receive parameters (such as a semi-static reference level parameter, a path-loss compensation factor, and a path loss estimate) from eNodeB 130, and use these received parameters, along with a measured downlink signal, to adjust power at which user equipment 110/120 transmits data, control information, and/or reference signals.

The parameters from eNodeB 130 may be tailored based on whether the user equipment to which the parameters are sent is a mobile user equipment 110 or a fixed user equipment 120. In one implementation, user equipment 110/120 may determine a semi-static operating point for a resource block, to achieve a SINR at eNodeB 130, based on the following:

$$\text{Resource Block Operating Point} = P_0 + \alpha_{\_Sub\_Type} * PL$$

where

Resource Block Operating Point (e.g., in decibels as referenced to one milliwatt) may correspond to the operating point for the particular resource block;

Po may represent a semi-static reference level parameter that controls the target SINR value measured by eNodeB 130;

$\alpha_{\_Sub\_Type}$ may represent a path loss compensation factor that allows a trade off between a specific user data rate at cell edge and an overall uplink sector capacity; and PL may represent a path loss estimate, as estimated by, for example, eNodeB 130.

In one implementation, the path loss compensation factor ($\alpha_{\_Sub\_Type}$) may be tailored based on whether the particular user equipment, performing the operating point calculation, is a mobile user equipment 110 or a fixed user equipment 120. By setting a larger value for the path loss compensation factor, eNodeB 130 may increase the user data rate at cell edge within that sector. However, a larger path loss compensation factor may create more interference to other adjacent sectors, thereby lowering overall uplink network capacity. For mobile user equipment 110, mobile power control component 332 may use a lower value for the path loss compensation factor to limit interference to other sectors. For fixed user equipment 120 with directional antennas, fixed power control component 334 may use a larger value for the path loss compensation factor since interference to other sectors is reduced due to the directionality of antennas of fixed user equipment 120. Thus, by using a larger value for the path loss compensation factor for fixed user equipment 120, user cell edge performance may be increased. Thus, a higher operating point is permissible for fixed user equipment 120 due to their lower interference to other adjacent sectors.

Power control component 330 may further control the modulation and coding scheme used by user equipment 110/120. For example, the modulation and coding scheme used by user equipment 110/120 may be associated with the power resource block to achieve a desired transmission information data rate. Thus, mobile power control component 332 may control the modulation and coding scheme used by mobile user equipment 110 and fixed power control component 334 may control the modulation and coding scheme used by fixed user equipment 120.

Handover component 340 may include one or more components that handle a handover procedure for eNodeB 130. The handover procedure may be device-assisted (e.g., the handover procedure may be based on measurements from user equipment 110/120, which may be noisy and need to be filtered prior to triggering a handover procedure). Handover component 340 may use multiple parameters in relation to the triggers that cause the initiation of the handover procedure. For example, the handover parameters may include a measurement filter and a hysteresis between serving sector signal strength and the candidate sector signal strength. These handover parameters may be optimized to satisfy two competing requirements—minimize false triggers and speed up essential handovers. Handover component 340 may set the filter and hysteresis parameters on a per user equipment type basis. Thus, by recognizing which user equipment is fixed user equipment 120, handover component 340 may set appropriate handover parameters for fixed user equipment 120, without sacrificing the performance of mobile user equipment 110.

As shown in FIG. 3, handover component 340 may include a mobile handover component 342 that controls handovers for mobile user equipment 110 and a fixed handover component 344 that separately controls handovers for fixed user equipment 120. In one example implementation, mobile handover component 342 may set filter and hysteresis parameters for handover operations relating to mobile user equipment 110. Moreover, fixed handover component 344 may set different filter and hysteresis parameters for handover operations relating to fixed user equipment 120.

Although FIG. 3 illustrates example functional components of eNodeB 130, in other implementations, eNodeB 130 may include fewer functional components, different functional components, differently arranged functional components, or additional functional components than those depicted in FIG. 3. For example, while user equipment type identification component 310 is shown as being implemented within eNodeB 130, alternatively, or additionally, user equipment type identification component 310 may be implemented within one or more different devices in radio access network 130 or within one or more different devices external to radio access network 130. Moreover, one or more functional components of eNodeB 130 may perform one or more tasks described as being performed by one or more other functional components of eNodeB 130.

FIG. 4 is a diagram of a portion of subscriber database 160. While only one database is described below, subscriber database 160 may include multiple databases stored locally or at one or more different and possibly remote locations. As illustrated, subscriber database 160 may maintain a group of entries in the following example fields: an identification (ID) field 410 and a user equipment type field 420.

Identification field 410 may store information that identifies a subscriber. The information may include, for example, an International Mobile Subscriber Identity (IMSI) or another type of identifier that uniquely identifies the subscriber (e.g., a Mobile Directory Number (MDN)). Additionally, or alternatively, identification field 410 may store information that identifies a particular user equipment. The information may include, for example, an Internet Mobile Equipment Identity (IMEI) or another type of identifier that uniquely identifies the particular user equipment.

User equipment type field 420 may store information that identifies a type of user equipment associated with the identifier in the corresponding identification field 410. For example, user equipment type field 420 may store information that identifies a user equipment as a mobile user equipment or a fixed user equipment.

Although FIG. 4 shows example fields of subscriber database 160, in other implementations, subscriber database 160 may include different fields, differently arranged fields, or additional fields than depicted in FIG. 4.

Figure 5:
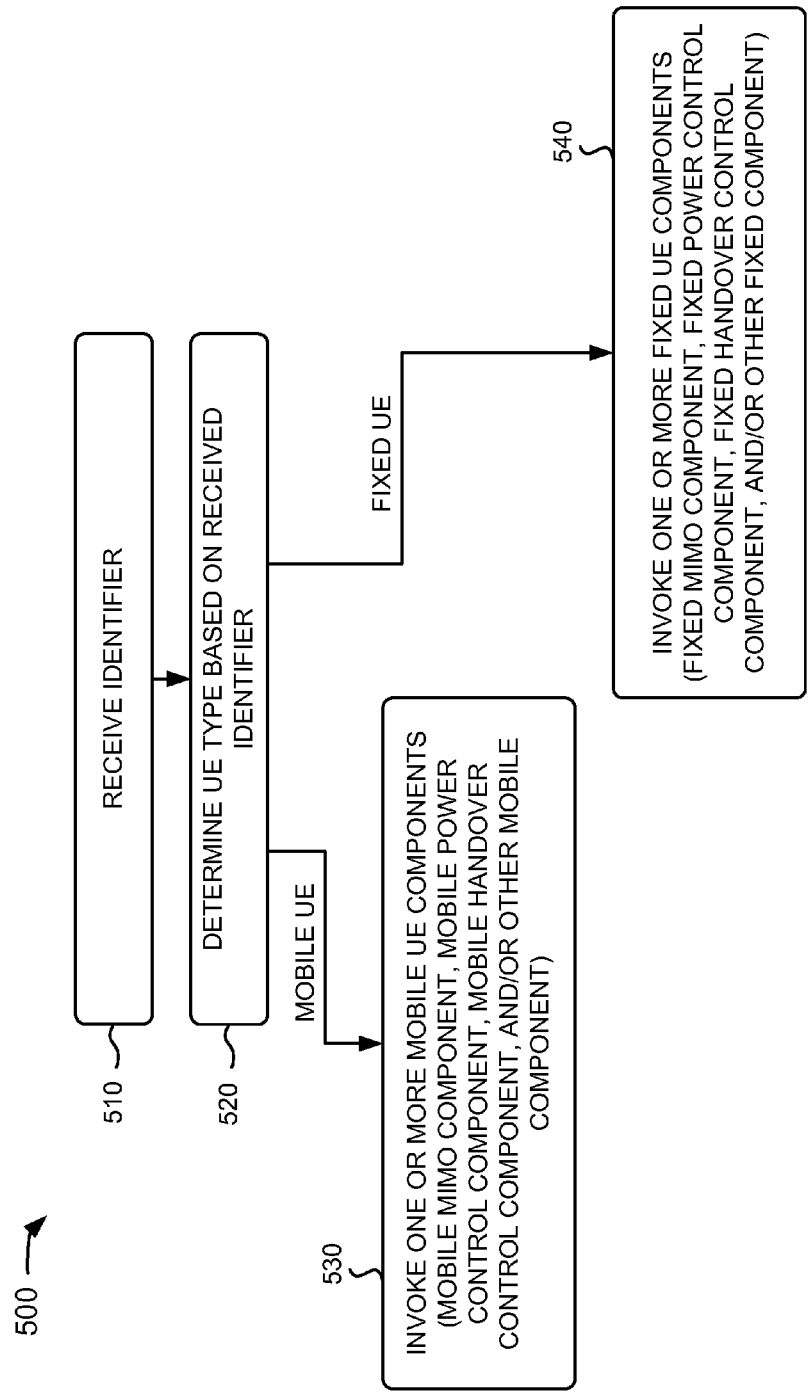

FIG. 5 is a flow chart of an example process 500 for managing user equipment. Process 500 may be performed by the EPS system (e.g., by one or more of eNodeB 130 or mobility management entity 135). In another implementation, some or all of the processing described in FIG. 5 may be performed by one or more devices separate from or in combination with the EPS system.

Process 500 may include receiving an identifier (block 510). For example, the EPS system may receive the identifier as part of a user equipment attachment procedure or during a user equipment reactivation procedure. The identifier may correspond to a subscriber or a particular user equipment associated with the subscriber. For example, the identifier may correspond to an IMSI or another type of identifier that uniquely identifies the subscriber. Additionally, or alternatively, the identifier may correspond to an IMEI or another type of identifier that uniquely identifies the subscriber's user equipment.

Process 500 may further include determining a type of the user equipment based on the received identifier (block 520). For example, the EPS system (e.g., user equipment type identification component 310) may receive the identifier and use the identifier to classify the user equipment as either mobile or fixed. In one implementation, user equipment type identification component 310 may access a database, such as subscriber database 160, using the received identifier to identify the type of the user equipment associated with the identifier. In an alternative implementation, user equipment type identification component 310 may provision a set of identifiers to fixed user equipment 120. User equipment type identification component 310 may maintain a list of these provisioned identifiers. User equipment type identification component 310 may, thus, determine whether the type of the user equipment is mobile or fixed by comparing the received identifier to the list of identifiers associated with fixed user equipment.

When the user equipment is determined to be mobile user equipment 110, process 500 may include invoking one or more mobile user equipment components (block 530). For example, the EPS system (e.g., eNodeB 130) may invoke mobile MIMO component 322, mobile power control component 332, and/or mobile handover component 342 in managing mobile user equipment 110. As discussed above, mobile MIMO component 322 may manage the downlink for the particular mobile user equipment 110 from which the identifier was received in block 510 and for all other mobile user equipment 110 attached to eNodeB 130. Mobile power control component 332 may manage the uplink for the particular mobile user equipment 110 from which the identifier was received in block 510 and for all other mobile user equipment 110 attached to eNodeB 130. Mobile handover component 342 may handle handoffs for the particular mobile user equipment 110 from which the identifier was received in block 510 and for all other mobile user equipment 110 attached to eNodeB 130.

Similarly, when the user equipment is determined to be fixed user equipment 120, process 500 may include invoking one or more fixed user equipment components (block 540). For example, the EPS system (e.g., eNodeB 130) may invoke fixed MIMO component 324, fixed power control component 334, and/or fixed handover component 344 in managing fixed user equipment 120. As discussed above, fixed MIMO component 324 may manage the downlink for the particular fixed user equipment 120 from which the identifier was received in block 510 and for all other fixed user equipment 120 attached to eNodeB 130. Fixed power control component 334 may manage the uplink for the particular fixed user equipment 120 from which the identifier was received in block 510 and for all other fixed user equipment 120 attached to eNodeB 130. Fixed handover component 344 may handle handoffs for the particular fixed user equipment 120 from which the identifier was received in block 510 and for all other fixed user equipment 120 attached to eNodeB 130. Fixed handover component 344 may also be used when fixed user equipment 120 are being moved to eNodeB 130.

In one implementation, eNodeB 130 may continually invoke mobile components 322/332/342 and fixed components 324/334/344 at an interval. The interval may be on the order of a millisecond or some other time interval. Alternatively, eNodeB 130 may invoke mobile components 322/332/342 and fixed components 324/334/344 based on an event, such as a change in radio conditions for one or more user equipment 110/120.

FIG. 6 is a flow chart showing additional details of block 520 according to one implementation. As shown, block 520 may include sending a request to a subscriber database for user equipment type information (block 610) and receiving a response, from the subscriber database, that includes the user equipment type information. For example, user equipment type identification component 310 may send a request to a database, such as subscriber database 160. The request may include the identifier. In response, subscriber database 160 may compare the identifier from the request against the list of identifiers in, for example, identifier field 410. If the identifier matches an entry in identifier field 410, subscriber database 160 may retrieve the information from user equipment type field 420 and return that information to user equipment type identification component 310. The retrieved information may include information identifying the user equipment as mobile or fixed.

FIG. 7 is a flow chart showing additional details of block 520 according to another implementation. In connection with FIG. 7, assume that eNodeB 130 maintains a list of identifiers associated only with fixed user equipment 120. With this assumption in mind, block 520 may include comparing the received identifier to the list of identifiers for fixed user equipment 120 (block 710). Block 520 may further include determining whether the received identifier matches an identifier in the list (block 720). If the received identifier does not match an identifier in the list (block 720—NO), block 520 may include determining that the user equipment, from which the identifier was received, is a mobile user equipment 110. On the other hand, if the received identifier matches an identifier in the list (block 720—YES), block 520 may include determining that the user equipment, from which the identifier was received, is a fixed user equipment 120.

Implementations herein may use different subsystems and parameters that are independently optimized for simultaneously managing mobile user equipment and fixed user equipment.

The foregoing description provides illustration and description, but is not intended to be exhaustive or to limit the invention to the precise form disclosed. Modifications and variations are possible in light of the above teachings or may be acquired from practice of the invention. For example, while the description above focuses on a 4G system, it will be appreciated that implementations described herein are equally applicable to other types of systems, such as, for example, a Worldwide Interoperability for Microwave Access (WiMAX) system.

While series of blocks have been described with regard to FIGS. 5-7, the order of the blocks may be modified in other implementations. Further, non-dependent blocks may be performed in parallel.

It will be apparent that embodiments, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions. A component, as used herein, may include hardware, such as a processor, ASIC, or FPGA, or a combination of hardware and software (e.g., a processor executing software).

It should be emphasized that the term "comprises/comprising" when used in this specification is taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
   one or more devices configured to:
   receive an identifier from user equipment,
   compare the received identifier to a list of identifiers, wherein the list of identifiers includes identifiers associated only with fixed user equipment,
   determine that a type of the user equipment is mobile user equipment when the received identifier does not match any identifier in the list of identifiers,
   determine that the type of the user equipment is the fixed user equipment when the received identifier matches an identifier in the list of identifiers;
   in response to determining that the type of the user equipment is the mobile user equipment, perform first management of radio resources for the user equipment using a first set of subsystems and parameters; and
   in response to determining that the type of the user equipment is the fixed user equipment, perform second management of the radio resources for the user equipment using a second, different set of subsystems and parameters,
   wherein when performing the first management of the radio resources using the first set of subsystems and parameters, the one or more devices are further configured to:
   invoke a first multiple input, multiple output (MIMO) component that has been tailored to manage downlink radio resources for the mobile user equipment,
   wherein when performing the second management of the radio resources using the second, different set of subsystems and parameters, the one or more devices are to:
   invoke a second MIMO component that has been tailored to manage downlink radio resources for the fixed user equipment,
   wherein the first MIMO component is to:
   use a first state machine for transitioning between different open loop MIMO modes, and
   use a second state machine for transitioning between different closed loop MIMO modes,
   wherein the second MIMO component is to:
   use a third state machine for transitioning between different open loop MIMO modes, and
   use a fourth state machine for transitioning between different closed loop MIMO modes,
   wherein the first state machine and the third state machine use one or more of different first filters, different first thresholds, or different first constants, and
   wherein the second state machine and the fourth state machine use one or more of different second filters, different second thresholds, or different second constants.

2. The system of claim 1, where the identifier corresponds to an International Mobile Subscriber Identity (IMSI) or an Internet Mobile Equipment Identity (IMEI).

3. The system of claim 1, wherein the one or more devices are further configured to:
   send a request to a subscriber database, the request including the identifier, and
   receive a response from the subscriber database, the response including information indicating whether the type of the user equipment is the mobile user equipment or the fixed user equipment.

4. The system of claim 1, where, when performing the first management of the radio resources using the first set of subsystems and parameters, the one or more devices are further configured to:
   invoke a first power control component that has been tailored to manage uplink radio resources for the mobile user equipment, and
   where, when performing the second management of the radio resources using the second, different set of subsystems and parameters, the one or more devices are to:
   invoke a second power control component that has been tailored to manage uplink radio resources for the fixed user equipment.

5. The system of claim 4, wherein the first power control component includes one or more components that control power for the mobile user equipment, for at least one of uplink data channels, uplink control channels, or reference signals transmitted from the mobile user equipment.

6. The system of claim 4, wherein the second power control component includes one or more components that control power for the fixed user equipment, for at least one of uplink data channels, uplink control channels, or reference signals transmitted from the fixed user equipment.

7. The system of claim 1, wherein the one or more devices are further configured to:
send a request to a subscriber database, the request including the identifier, and
receive a response from the subscriber database, the response including information indicating whether the type of the user equipment is the mobile user equipment or the fixed user equipment, and
wherein the identifier corresponds to an International Mobile Subscriber Identity (IMSI) or an Internet Mobile Equipment Identity (IMEI).

8. The system of claim 1, where, when performing the first management of the radio resources using the first set of subsystems and parameters, the one or more devices are further configured to:
invoke a first handover component that has been tailored to manage handovers for the mobile user equipment, and
where, when performing the second management of the radio resources using the second, different set of subsystems and parameters, the one or more devices are to:
invoke a second handover component that has been tailored to manage handovers for the fixed user equipment.

9. A method comprising:
performing, by a device, first management of radio resources for mobile wireless user equipment using a first set of subsystems and parameters; and
performing, by the device, second management of radio resources for fixed wireless user equipment using a second, different set of subsystems and parameters,
wherein performing the first management of the radio resources for the mobile wireless user equipment includes invoking a first multiple input, multiple output (MIMO) component that has been tailored to manage downlink radio resources for the mobile wireless user equipment,
wherein invoking the first MIMO component includes:
using a first state machine for transitioning between different open loop MIMO modes, and
using a second state machine for transitioning between different closed loop MIMO modes,
wherein performing the second management of radio resources for the fixed wireless user equipment includes invoking a second MIMO component that has been tailored to manage downlink radio resources for the fixed wireless user equipment,
wherein invoking the second MIMO component includes:
using a third state machine for transitioning between different open loop MIMO modes, and
using a fourth state machine for transitioning between different closed loop MIMO modes,
wherein the first state machine and the third state machine use one or more of different first filters, different first thresholds, or different first constants, and
wherein the second state machine and the fourth state machine use one or more of different second filters, different second thresholds, or different second constants.

10. The method of claim 9, further comprising:
receiving an identifier from user equipment; and
determining, using the received identifier, whether a type of the user equipment is the mobile wireless user equipment or the fixed wireless user equipment.

11. The method of claim 10, where the identifier corresponds to an International Mobile Subscriber Identity (IMSI) or an Internet Mobile Equipment Identity (IMEI).

12. The method of claim 9, where performing the first management of the radio resources for the mobile wireless user equipment includes:
invoking a first power control component that has been tailored to manage uplink radio resources for the mobile wireless user equipment, and
where performing the second management of the radio resources for the fixed wireless user equipment includes:
invoking a second power control component that has been tailored to manage uplink radio resources for the fixed wireless user equipment.

13. The method of claim 9, where performing the first management of the radio resources for the mobile wireless user equipment includes:
performing handovers for the mobile wireless user equipment using a first set of handover parameters, and
where performing the second management of the radio resources for the fixed wireless user equipment includes:
performing handovers for the fixed wireless user equipment using a second, different set of handover parameters.

14. The method of claim 9, further comprising:
receiving an identifier from wireless user equipment;
comparing the received identifier to a list of identifiers, wherein the list of identifiers includes identifiers associated only with fixed user equipment;
determining that a type of the wireless user equipment is the mobile user equipment when the received identifier does not match any identifier in the list of identifiers; and
determining that the type of the wireless user equipment is the fixed user equipment when the received identifier matches an identifier in the list of identifiers.

15. The method of claim 14, further comprising:
sending a request to a subscriber database, the request including the identifier, and
receiving a response from the subscriber database, the response including information indicating whether the type of the wireless user equipment is the mobile user equipment or the fixed user equipment.

16. A network device comprising:
a one or more processors configured to:
perform, using a first set of parameters, first management of at least one of uplink radio resources or downlink radio resources for a group of mobile user equipment; and
perform, using a second set of parameters, second management of at least one of uplink radio resources or downlink radio resources for a group of fixed user equipment, the second set of parameters being different than the first set of parameters,
wherein when performing the first management of the radio resources for the mobile user equipment, the one or more processors are configured to invoke a first multiple input, multiple output (MIMO) component that has been tailored to manage downlink radio resources for the mobile user equipment,
   wherein when invoking the first MIMO component, the one or more processors are configured to:
   use a first state machine for transitioning between different open loop MIMO modes, and
   use a second state machine for transitioning between different closed loop MIMO modes,
wherein when performing the second management of radio resources for the fixed user equipment, the one or more processors are configured to invoke a second MIMO component that has been tailored to manage downlink radio resources for the fixed user equipment,
   wherein when invoking the second MIMO component, the one or more processors are configured to
   use a third state machine for transitioning between different open loop MIMO modes, and
   use a fourth state machine for transitioning between different closed loop MIMO modes,
wherein the first state machine and the third state machine use one or more of different first filters, different first thresholds, or different first constants, and
   wherein the second state machine and the fourth state machine use one or more of different second filters, different second thresholds, or different second constants.

17. The network device of claim 16, where, when the one or more processors perform the first management of the at least one of the uplink radio resources or the downlink radio resources for the group of mobile user equipment, the one or more processors:
   manages the uplink radio resources for the group of mobile user equipment,
   manages the downlink radio resources for the group of mobile user equipment, and
   manages handovers for the group of mobile user equipment, and
   when the one or more processors perform the second management of the at least one of the uplink radio resources or the downlink radio resources for the group of fixed user equipment, the one or more processors:
   manages the uplink radio resources for the group of fixed user equipment,
   manages the downlink radio resources for the group of fixed user equipment, and
   manages handovers for the group of fixed user equipment,
   where parameters used by the one or more processors to perform the first management of the at least one of uplink radio resources for the group of mobile user equipment are different from parameters used by the one or more processors to perform the second management of the at least one of uplink radio resources for the group of fixed user equipment,
   where parameters used by the one or more processors to perform the first management of the at least one of downlink radio resources for the group of mobile user equipment are different from parameters used by the one or more processors to perform the second management of the at least one of downlink radio resources for the group of fixed user equipment, and
   where parameters used by the one or more processors to manage the handovers for the group of mobile user equipment are different from parameters used by the one or more processors to manage the handovers for the group of fixed user equipment.

18. The network device of claim 16, where, when performing second management of the at least one of the uplink radio resources or the downlink radio resources, the one or more processors are further configured to:
   switch, for fixed user equipment in the group of fixed user equipment, from an open loop spatial multiplexing mode to a closed loop spatial multiplexing mode.

19. The network device of claim 16, wherein the one or more processors are further configured to:
   receive an identifier from user equipment,
   compare the received identifier to a list of identifiers, wherein the list of identifiers includes identifiers associated only with fixed-type user equipment,
   determine that a type of the user equipment is the mobile user equipment when the received identifier does not match any identifier in the list of identifiers,
   determine that the type of the user equipment is the fixed user equipment when the received identifier matches an identifier in the list of identifiers.

20. The network device of claim 19, where the identifier corresponds to an International Mobile Subscriber Identity (IMSI) or an Internet Mobile Equipment Identity (IMEI).

* * * * *